United States Patent [19]

Felisberto et al.

[11] Patent Number: 5,413,842

[45] Date of Patent: May 9, 1995

[54] GREEN SHEETS OF CONTROLLED MICROPOROSITY AND METHOD OF PRODUCING SAME

[75] Inventors: Cynthia N. Felisberto, State College, Pa.; Stephen A. Milkovich, Beacon; Robert W. Nufer, Hopewell Junction, both of N.Y.

[73] Assignee: International Business Machines Corporation, Armonk, N.Y.

[21] Appl. No.: 226,396

[22] Filed: Apr. 12, 1994

Related U.S. Application Data

[63] Continuation of Ser. No. 997,807, Dec. 29, 1992, abandoned.

[51] Int. Cl.⁶ .................................................. B32B 9/00
[52] U.S. Cl. .................................... 428/209; 428/210; 428/901
[58] Field of Search .................... 264/61, 63, 56; 428/210, 701, 209, 688, 689, 901; 501/126, 129

[56] References Cited

U.S. PATENT DOCUMENTS

| | | | |
|---|---|---|---|
| 3,962,389 | 6/1976 | Takase | 264/56 |
| 4,080,414 | 3/1978 | Anderson et al. | 428/201 |
| 4,104,345 | 8/1978 | Anderson et al. | 428/201 |
| 4,301,324 | 11/1981 | Kumar | 174/68.5 |
| 4,387,131 | 6/1983 | Anderson et al. | 428/201 |
| 4,598,107 | 7/1986 | Herron | 264/63 |
| 4,627,160 | 12/1986 | Herron | 264/63 |
| 4,810,463 | 3/1989 | Schwarz | 264/63 |
| 5,130,067 | 7/1992 | Flaitz et al. | 264/60 |
| 5,147,484 | 9/1992 | Chance | 264/61 |

OTHER PUBLICATIONS

IBM Technical Disclosure Bulletin, vol. 26, No. 6, Nov. 1983, R. W. Nufer, "Improved Green Sheet", pp. 2728–2729.

Nufer 1992, "Ceramic Greensheet Technology for Glass-Ceramic/Copper Multilevel Substrates", Electronic Components and Technology Conference, San Diego, Calif. 42: 673–677.

*Primary Examiner*—Patrick J. Ryan
*Assistant Examiner*—Patrick R. Jewik
*Attorney, Agent, or Firm*—Whitham, Curtis, Whitham & McGinn; Harold Huberfeld

[57] ABSTRACT

Ceramic green sheets of controlled microporosity and method of making same have been provided. Controlled microporosity is achieved by including certain ionic species in the ceramic composition, particularly boron, phosphorus and copper oxide.

11 Claims, 2 Drawing Sheets

RHEOLOGY OF GLASS CERAMIC POR SLURRY AS A FUNCTION OF $B_2O_3$ ADDITIONS

GREEN SHEETS OF CONTROLLED MICROPOROSITY AND METHOD OF PRODUCING SAME

This application is a continuation of application Ser. No. 07/997,807, filed Dec. 29, 1992, now abandoned.

BACKGROUND OF THE INVENTION

1. Field of the Invention

The present invention relates generally to ceramic circuit structures such as thin tapes and sheets. More particularly, the present invention is related to providing ceramic green sheets of controlled microporosity.

2. Description of the Prior Art

In general, ceramic green sheets are prepared from ceramic paints by mixing a ceramic particulate, a thermoplastic polymer and solvents. The paint is then cast or spread into ceramic sheets or slips from which the solvents are subsequently volatilized to provide a coherent and self-supporting flexible ceramic green sheet, which may be finally fired to drive off the resin and sinter the ceramic particulates into a densified ceramic substrate.

In the fabrication of multilevel structures, an electrical conductor forming composition is deposited in a pattern on ceramic green sheets which form components in the multilevel structure. The component green sheets may have via or feed-through holes punched in them. The required number of component green sheets are stacked or superimposed in register on each other in the desired order. The stack of green sheets is then compressed or compacted at a necessary temperature to effect a bond between adjacent layers of the green sheets in the portions between adjacent layers not separated by the electrical conductor forming pattern. Thereafter, the green sheet laminate is fired to drive off the binders and to sinter the ceramic dielectric structure having the desired pattern of electrical conductors extending internally therein.

It is generally considered essential (as elaborated more fully in U.S. Pat. Nos. 2,966,719 and 3,125,618) that the density of the fired ceramic approach the theoretical possible figure for the raw material (e.g. ceramic particulate) selected, and also that the ceramic product be non-porous without formation of micropores in order to prevent detrimental effect upon the electrical characteristics thereof. The formation of such non-porous fired ceramics results in a void-free densification of the ceramic particulate in green sheets which when sintered provides a densified ceramic product. However, it should be noted that although such densified ceramic green sheets have been found satisfactory for single level ceramic structures, they nevertheless provide serious problems in attempts to laminate them into multilevel structures, particularly where electrical conductor patterns are sandwiched or otherwise incorporated between levels.

As will be evident, a pattern of electrical conductors when coated on a green sheet defines a relief pattern whose top surface is raised relative to the uncoated surface of the green sheet. Thus, in laminating a second superimposed green sheet on a conductor patterned green sheet, it will be necessary to compress the two green sheets together to bring uncoated adjacent portions of the green sheets in contact with one another so that the portions may be bonded to form the desired integrated or unified ceramic laminate or structure (See Nufer 1992, "Ceramic Greensheet Technology For Glass-Ceramic/Copper Multilevel Substrates, Electronic Components and Technology Conference, San Diego, Calif., 42:673-677).

Although the binder resin characterizes the green ceramic sheet with some degree of pliancy and ductility, any extended flow or extrusion of individual green sheets in the stack within their plane under compression, will necessarily be attended by distortion elongation and/or possible rupture of any electrical conductor pattern which may be contained between adjacent green sheets in the stack. Accordingly, it is essential that the green sheets employed in the fabrication of a multilayer ceramic must be characterized by dimensional stability within their plane which precludes lateral flow of the green ceramic, if the integrity of the conductor pattern is to be maintained, and to insure registration of the green ceramic laminae of the stack. As a consequence, it is necessary that any distortions of a stack of green sheets under compression be substantially limited in the vertical planes when the uncoated sections of adjacent green sheets are brought into contact for bonding while closely conforming about the conductor pattern to insure complete conductor line enclosure.

Green sheet compositions available heretofore have not been amenable to compressive bonding to each other due to the inherent resiliency of the binder systems employed for the ceramic particulate. As a consequence, upon release of compression, the resiliency of the binder system is characterized with an elastic rebound or spring-back frequently accompanied by rupture of the bonded interface between adjacent green sheet laminae in the stack.

Accordingly, it is considered essential that a green ceramic sheet be provided for multilayer structures having lateral dimensional stability with sufficient compressibility to enable a necessary set to permit bonding to each other about an enclosed raised conductor pattern, while maintaining the desired degree of densification consonant with necessary electrical and dielectric characteristics.

As mentioned above, although densified ceramic green sheets are found satisfactory for single level ceramic structures, they pose serious problems when laminated into multilevel structures, particularly where electrical conducting patterns are sandwiched or otherwise incorporated between levels. Hence, controlled microporosity is essential for constructing reliable and stable multilevel structures.

SUMMARY OF THE INVENTION

It is therefore an object of the present invention to provide ceramic green sheets of controlled microporosity and a method of producing same.

Other objects and advantages will become evident from the following detailed description of the invention.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENT OF THE INVENTION

The above and various other objects and advantages of the present invention are achieved by providing a ceramic green sheet or tape of more uniform density, compressibility, surface porosity and dielectric thickness than heretofore available. Controlled uniformity in tape properties is obtained by addition of specific chemicals to ceramic slurry. For example, addition of ionic species, such as phosphorus, boron, copper oxide ($Cu_2O$) and the like in their ionic form, causes the polyvinylbutyral (PVB) in the slurry to react in a manner so as to form a slurry that sets quickly during solvent evaporation resulting in a less dense tape. Phosphorus and boron can be in the form of $P_2O_5$ and $B_2O_3$, respectively, and can also be a part of a glass composition from which phosphorus or boron can be leached into the binder solution during slurry making.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the methods and materials described herein are preferred. Unless mentioned otherwise, the techniques employed or contemplated herein are standard methodologies well known to one of ordinary skill in the art. The materials, methods and examples are only illustrative and not limiting.

The multilayer ceramic (MLC) green sheet formulation and glass ceramic utilizes a polyvinylbutyral (PVB) binder system. This green sheet is the basic building block guaranteeing the positional accuracy of all the interconnection vias and metallurgical features. A typical formulation is shown in Table 1. In the case of glass ceramic products, a plurality of via connections must be aligned in each of the multilayer substrates. This is accomplished by precise property control. One of the most critical of these properties is the formation and control of the sheet's microporous structure. This sheet microporosity is created in the sheet to insure penetration of metallurgical patterns into the green sheet and to insure that the patterns are totally enclosed by the ceramic. Line enclosure is essential for the manufacture of all MLC substrates. It is one of the key factors in the success of the Thermal Conduction Modules (TCM). Increased microporosity also has the added benefit of improving metallurgical screening and increased continuous caster thruput driven by the higher evaporation rates that can be achieved with a more porous structure. The rheological changes that occur and govern the onset of sheet formation can produce a more homogeneous sheet relative to binder distributions.

Microporosity can be varied in the green sheet through changes in the PVB chemistry (molecular wt., functional group chemistry, etc.), and particle surface chemistry.

Figure 1:
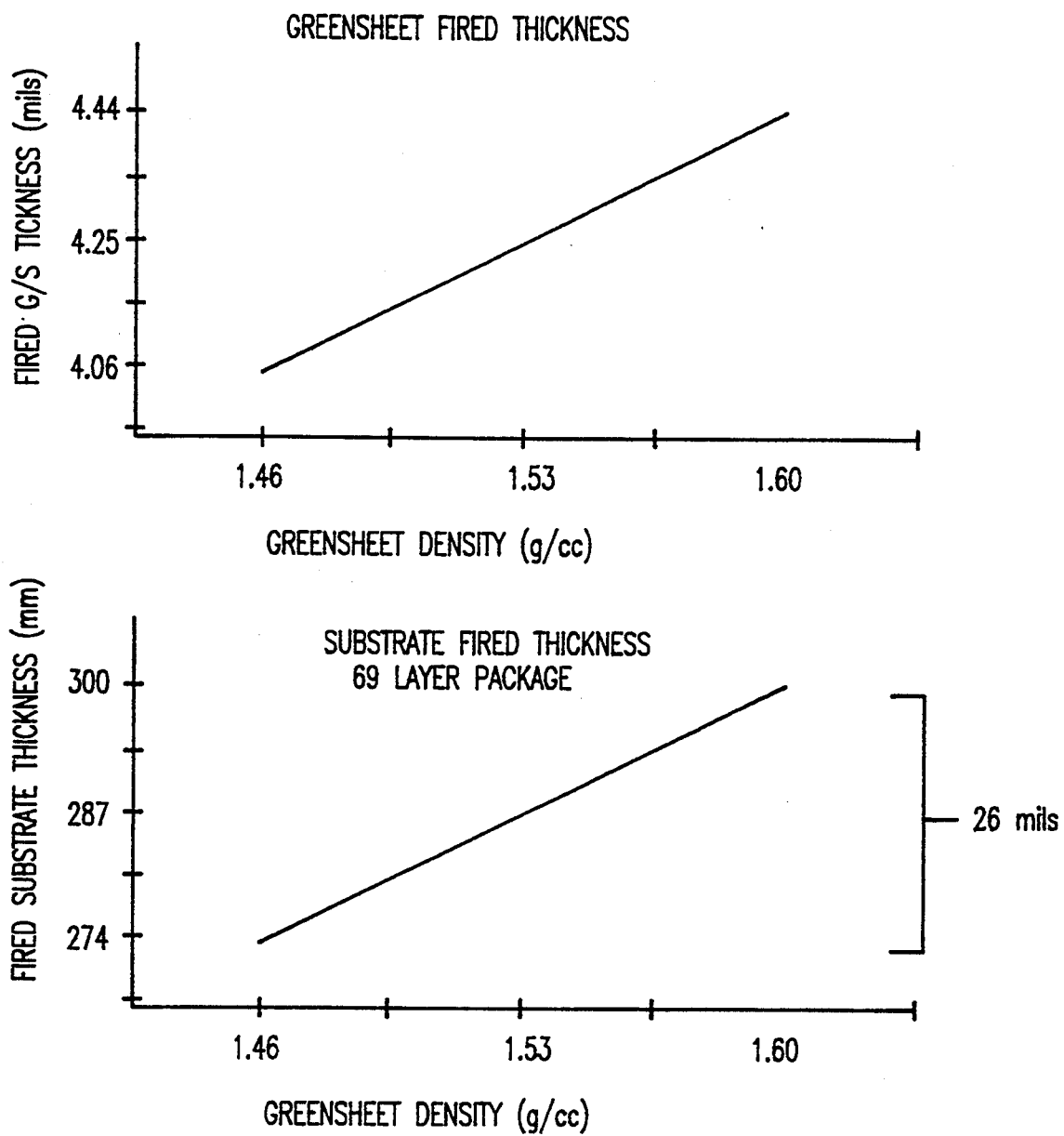
FIG. 1 shows the relationship of substrate thickness to green sheet density.

With the glass ceramic and similar technologies, the control of sheet microporosity for line enclosure and final substrate thickness control is essential. FIG. 1 illustrates how final thickness of a multilayer substrate can vary as a function of green density.

In accordance with the present invention, sheet formation mechanism is controlled with the addition of ionic species that react with the PVB molecule forming an apparently higher molecular weight complex or ester. Small addition of materials such as phosphorus, boron, and the like in an amount ranging from about 10 to 500 ppm by weight, and of $Cu_2O$ in an amount ranging from about 10–10,000 ppm, alters the rheological properties of the green sheet slurry and causes the slurry to set earlier making a less dense structure with a greater microporosity and lower green sheet density. This provides a green sheet with greater compressibility and with a thinner dielectric layer in the finished fired product.

Without being bound to any specific theory or postulate, it is believed that boron added as boron anhydride or boric acid undergoes the following reactions. In the final reaction, the PVB reacts forming a boron PVB ester linkage as follows:

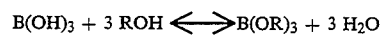

(R = PVB or PVB ester)

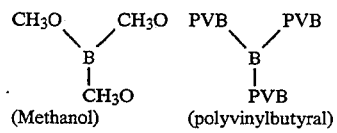

Figure 2:
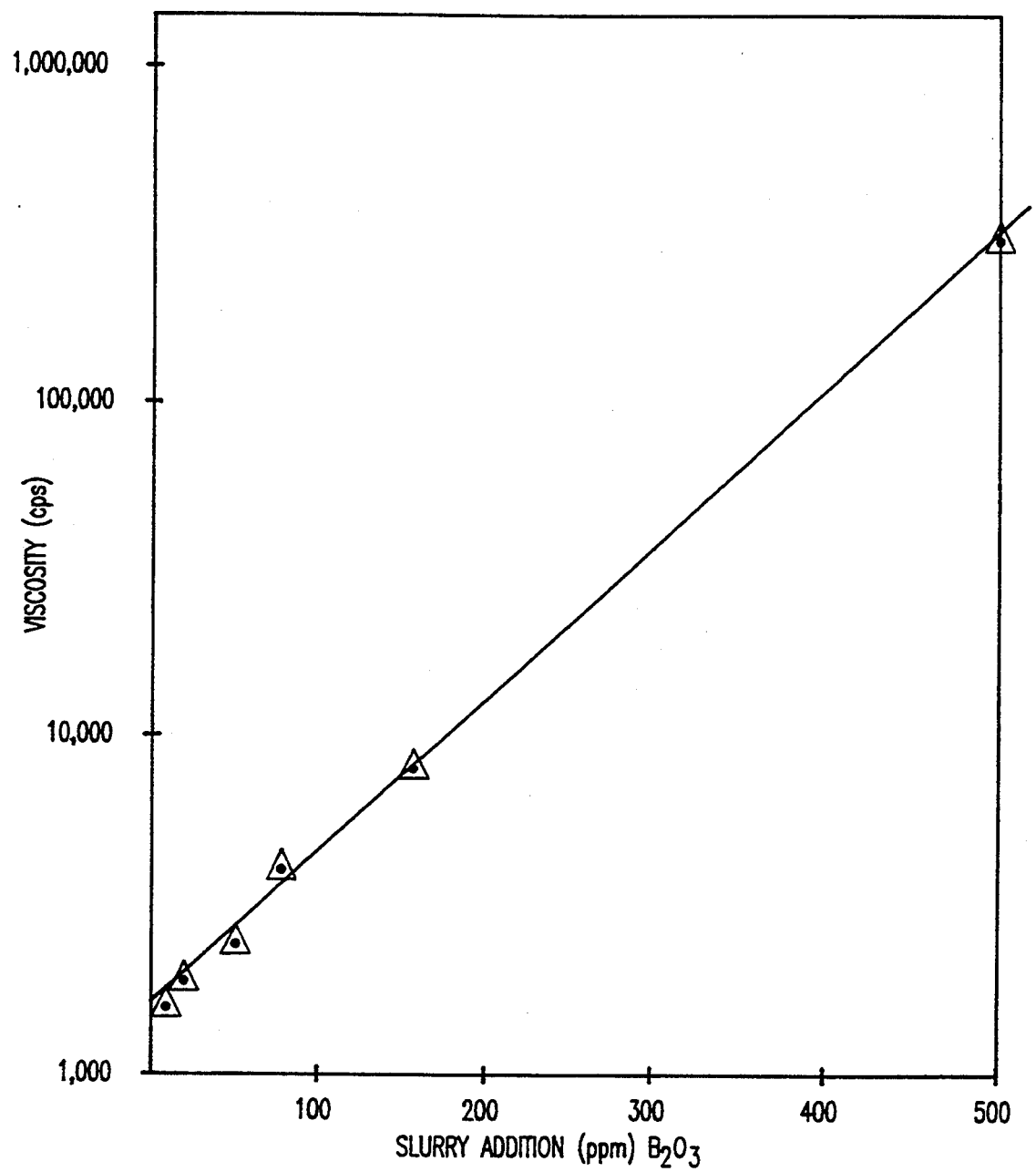
FIG. 2 shows the relationship of glass ceramic slurry rheology as a function of addition of ionic species.

This reaction results in an increase in apparent molecular weight that causes a rheological change as shown in FIG. 2. The glass ceramic slurry viscosity increases as a logarithmmic function of boric anhydride additions (10 to 500 ppm). The same response occurs with alumina based systems (data not shown) and can be used to control the sheet properties of the product.

The ability to adjust and control sheet microporosity has broad benefits that include the control of metallurgical paste screening, increased sheet drying and consequently higher continuous casting rates.

To prepare the ceramic paint, the ceramic particulate, binder resin and solvent system are thoroughly blended, as in a ball mill, and de-aired so that the ceramic particulates are coated with the binder resin to provide a smooth uniformly dispersed ceramic slurry. In general, the desired properties in the green ceramic control the relative proportions of the binder resin and ceramic particulate in the ceramic paint which need only contain sufficient quantities of the solvent system to provide sufficient viscosity which will enable casting the paint into a cohesive ceramic slip. Generally, the green ceramic, upon drying of the slip, will comprise from about 80 to about 95 wt. percent of ceramic particulate and from about 5 to about 20 wt. percent of the binder resin, and preferably the amount of the ceramic particulate should be at least 85 wt. percent of the green sheet, with the remainder being the binder resin and optionally a plasticizer. Normally, the binder resin will comprise from about 0 to about 50 wt. percent plasticizer.

Conversely, the relative proportion of the ceramic particulate to binder resin of the green sheet will be the same in the ceramic paint which will also contain a sufficient amount of the solvent system to provide, as indicated above, a slurry of sufficient viscosity to cast a cohesive ceramic slip. The specific quantity of the solvent system in the ceramic paint will normally be that which will provide a Brookfield or Haake viscosity in the range of about 500 to about 2500 cps at a shear rate of 50 sec$^{-1}$, and preferably from about 1200 to about 1800 cps.

After blending of the ceramic paint, it is then suitably cast on a removable flexible supporting tape, such as Mylar (a glycol terephthalic acid polyester), polyethylene terephthalate (PET), Teflon (polytetrafluoroethylene) and the like, on which it may be spread and leveled by use of a doctor blade technique to provide the desired thickness of the green ceramic sheet. Thickness may range from 3 to 15 mils.

The cast ceramic slip is dried by evaporation of the solvent system at temperatures to provide controlled volatilization in accordance with well known principles in the art, which minimize bubbling, cracking, buckling, volatilization of plasticizer, and the like, of the drying ceramic slip. Normally, the drying temperatures will be sufficiently below the boiling of the solvent fractions of the solvent system to obtain full benefit of the differential in evaporation rates of the highly volatile solvent and the less volatile asolvent of the solvent system. For example, with a binary solvent system of methanol and which for slips of 3 to 15 mls may be in the range of about 14 minutes to about one hour. The tape can also be continuously cast and dried at elevated temperatures.

As hereinbefore indicated, by the use of a solvent system in accordance with this invention, there is a unique differentiation in the volatilization of the more volatile solvent fraction and the less volatile asolvent fraction in conjunction with modification of the characteristic of drying ceramic slip. In this respect, as the more volatile solvent fraction evaporates, the binder resin is precipitated in a self-supporting matrix while entrapping the remaining less volatile asolvent within its matrix. Studies indicate that as the drying of the cast ceramic continues, the less volatile asolvent fraction is evaporated by diffusion through the binder resin leaving a uniform matrix of micropores therein which permit sufficient compression of the resultant green ceramic without any significant lateral distortion.

For the fabrication of multilayer structures, ceramic green sheet components are shaped and provided, as by mechanically punching, with register and via holes with a metallizing composition screened on required sheet units and via holes in the desired circuit pattern.

The circuit pattern is formed in accordance with conventional techniques by coating, directly on a surface of a green ceramic sheet, a layer of an electrical conductor forming compositions in the pattern desired for electrical conduction. The conductor pattern may be formed of binder suspended metallic compounds convertible by heat to electrically conductive metals, or metallic particles suspended in a heat volatile binder for sintering of the metallic particles by firing at elevated temperatures.

After removal of the supporting tape from the component sheets, they are then stacked in registration with each other, and pressed together under pressure sufficient to bring the uncoated surfaces of adjacent green sheets in contact with each other which are then bonded together by hot pressing and fusing the binder resin of the stacked green sheets, forming a unitized structure enclosing and supporting the patterns of the conductor forming composition within the structure matrix. During lamination, by hot pressing, the structural modification of the binder resin, in accordance with this invention, enables sufficient compaction or compression of the green sheets to conform about the conductor forming patterns and accommodate for the resiliency of the binder resin which, normally by virtue of elastic return would tend to spring back or recover to its original position, thus tending to separate and rupture the interfacial bonding of the green sheets.

As will be apparent, coating a surface of a green sheet with the conductor forming compositions conversely results in a pattern of raised elevations which act as a spacer which will maintain a separation of the uncoated complementary portions of the sheet and adjacent uncoated portions of a second superimposed green sheet. As a consequence, an initial compression is required in green sheet portions contacting the metallurgy, before the uncoated portions can be pressed together and the binder resin coalesced into the desired bond between the stacked green sheets. The normal tendency of the resilient resin binder to spring back, on release of compressive pressures (particularly at the more compressed portions at the metallurgy) and thus tend to separate and rupture the formed bond in the uncoated portions, is minimized by this invention. The integrity of the bond is maintained by permitting compaction and compression of the microporous structure of the binder resin at the metallurgy where the green sheet is accordingly densified to counteract the natural resiliency of the binder resin to spring back in elastic return.

After lamination of the stacked green sheets, the unit is fired to burn off the binder resin of the green material and conductor compositions and to sinter the ceramic particulate and develop the conductor patterns, normally nonporous structure.

In accordance with one example of this invention, a uniform ceramic paint was prepared by ball milling the constituents shown in Table 1.

TABLE 1

| CERAMIC SLURRY AND GREENSHEET COMPOSITION | |
|---|---|
| | Approximate Wt % |
| Slurry | |
| Glass Powder (0.3–0.5μ) | 50–70 |
| Polyvinylbutyral (PVB) | 2–7 |
| Dipropylene Glycol Dibenzoate (DGD) | 0.6–5 |
| Methanol | 6–30 |
| Methylisobutyl ketone (MIBK) | 6–30 |
| Ionic Species | 1–10,000 ppm |
| Green Sheet | |
| Glass Powder | 84–96 |
| PVB | 4–16 |
| DGD | 4–16 |

The ceramic paint was then filtered, deaerated and cast into a slip on a suitable substrate, e.g., Mylar tape, using a doctor blade; dried at room temperature (e.g. 23° C.) and green ceramic sheets having a thickness between 4–12 mils are continuous cast. The green sheets obtained had the properties shown in Table 2.

TABLE 2

| GREENSHEET PROPERTIES | |
|---|---|
| Density g/cc | 1.46–1.60 |
| Laminate Density g/cc | 1.64–1.72 |
| Percent Compressibility | >8.0 |
| Bond Strength Kg/cm$^2$ | >20 |
| Tensile Strength Kg/cm$^2$ | >20 |
| Fired Shrinkage (volume percent) | 35–45 |

The green sheet was cut into about 180 mm square blanks, into which register holes and via holes were punched. A 20 micron thick layer of an electrical conductor forming composition was then screen coated on selected green sheet units in a pattern desired for electrical conduction. The specific conductor composition contained about 84 wt. percent of finely divided copper (about 3 micron) in a labile organic thermoplastic binder (e.g. ethyl cellulose) and a solvent (e.g., Texanol) to provide sufficient fluidity and viscosity to the conductor composition for coating. The solvent was evaporated from the coated composition at 75° C. for about 60 minutes. The green sheet units, after removal of the Mylar supporting tape, were then stacked on each other in proper relation, by means of the register holes placed on positioning posts of a press platen. The assembly was then laminated under a pressure of 2600 psi while heated at ~95° C. for ten minutes without any volatilization of the binder resin.

This shaped green laminate was inserted into a firing furnace and fired as described in Herron et al. U.S. Pat. No. 4,234,367 to burn off the binder resin and sintering of the ceramic particulate to form the final ceramic structure.

Given the guidance and directions set forth herein above, ceramic green sheets can also be formed utilizing an alumina composition. An example of an alumina composition is given in Table 3 and the properties of the ceramic green sheet obtained therefrom are shown in Table 4.

TABLE 3

ALUMINA COMPOSITION FOR GREENSHEET

| | Parts by Wt |
|---|---|
| Alumina (average particle size 0.5μ) | 50–75 |
| PVB | 2–8 |
| Plasticizer (e.g Benzofler 9-88) | 0.5–5 |
| Methanol | 4–30 |
| MIBK | 4–30 |
| Ionic Species | 1–10,000 ppm |

TABLE 4

PRPERTIES OF CERAMIC GREENSHEET FROM ALUMINA

| | |
|---|---|
| Density g/cc | 1.9–2.1 |
| Fired Density g/cc | >3.63 |
| Percent Compressibility | >8.0 |
| Bond Strength Kg/cm$^2$ | >14.1 |
| Tensile Strength Kg/cm$^2$ | >28 |
| Fired Shrinkage (volume percent) | 16.8–17.5 |
| Percent Weight Loss | 7.6–8.3 |

It is understood that the embodiments described herein are for illustrative purposes only and that various changes or modifications in light thereof will be suggested to persons skilled in the art and such changes are included within the spirit and purview of this application and scope of the appended claims.

Having thus described our invention, what we claim as new and desire to secure by Letters Patent is as follows:

1. A composition of matter consisting of in parts by weight:
   Ceramic particulate: 50–75
   Polyvinylbutyral: 2–8
   Dipropylene Glycol Benzoate: 0.5–5
   Methanol: 4–30
   Methylisobutyl ketone: 4–30, and an
   Ionic Species: 1–10,000 ppm,
said ionic species being selected from the group consisting of boron and phosphorous compounds in their ionic form, said composition of matter capable of achieving a percent compressability of greater than 8 percent.

2. The composition of claim 1, wherein said ceramic particulate is glass or alumina powder of average particle size 0.5–5.0 micron.

3. The composition of claim 1, wherein said phosphorus and boron is part of a glass composition and can be leached into binder solution of polyvinylbutyral, dipropylene glycol dibenzoate, methanol and methylisobutyl ketone.

4. The composition of claim 1, wherein said ionic species is boron.

5. The composition of claim 4, wherein said boron is in the form of boron anhydride or boric acid.

6. The composition of claim 5, wherein said boron is in an amount ranging from about 10 to 500 ppm.

7. The composition of claim 1, wherein said ionic species is phosphorus.

8. The composition of claim 7, wherein said phosphorus is in the form of $P_2O_5$.

9. The composition of claim 8, wherein said phosphorus is in an amount ranging from about 10 to 500 ppm.

10. A ceramic greensheet formed from the composition of claim 1.

11. A laminated, multilevel ceramic green sheet structure having electrical conductive pattern therein, made from the composition of claim 1.

* * * * *